United States Patent
Takeuchi et al.

(10) Patent No.: US 12,272,786 B2
(45) Date of Patent: Apr. 8, 2025

(54) SOLID ELECTROLYTE MATERIAL AND BATTERY USING SAME

(71) Applicant: Panasonic Intellectual Property Management Co., Ltd., Osaka (JP)

(72) Inventors: Kaori Takeuchi, Osaka (JP); Yoshiaki Tanaka, Kyoto (JP); Koki Ueno, Osaka (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 484 days.

(21) Appl. No.: 17/697,994

(22) Filed: Mar. 18, 2022

(65) Prior Publication Data

US 2022/0209290 A1 Jun. 30, 2022

Related U.S. Application Data

(63) Continuation of application No. PCT/JP2020/036497, filed on Sep. 28, 2020.

(30) Foreign Application Priority Data

Oct. 17, 2019 (JP) .................................. 2019-190370
Feb. 5, 2020 (JP) .................................. 2020-018300

(51) Int. Cl.
- *H01M 10/0562* (2010.01)
- *H01M 4/04* (2006.01)
- *H01M 10/0525* (2010.01)

(52) U.S. Cl.
CPC ..... *H01M 10/0562* (2013.01); *H01M 4/0407* (2013.01); *H01M 10/0525* (2013.01); *H01M 2300/008* (2013.01)

(58) Field of Classification Search
CPC .......... H01M 10/0562; H01M 4/0407; H01M 2300/008; H01M 2300/0068; C01G 33/006; C01P 2002/72
See application file for complete search history.

(56) References Cited

U.S. PATENT DOCUMENTS

| | | | |
|---|---|---|---|
| 6,872,492 B2 * | 3/2005 | Barker | H01M 4/5825 |
| | | | 429/231.95 |
| 2012/0301796 A1 | 11/2012 | Ohtomo et al. | |
| 2019/0221837 A1 | 7/2019 | Ishikawa et al. | |
| 2020/0335817 A1 | 10/2020 | Asano et al. | |

FOREIGN PATENT DOCUMENTS

| | | |
|---|---|---|
| CN | 110048087 A | 7/2019 |
| JP | 2011-129312 | 6/2011 |
| JP | 2019-125574 | 7/2019 |
| JP | 2019-145489 | 8/2019 |
| WO | 2019/135348 | 7/2019 |

OTHER PUBLICATIONS

The Indian Office Action, dated Feb. 26, 2024, for the related Indian Patent Application No. 202247021115.
International Search Report of PCT application No. PCT/JP2020/036497 dated Nov. 10, 2020.

* cited by examiner

*Primary Examiner* — Aiqun Li
(74) *Attorney, Agent, or Firm* — GREENBLUM & BERNSTEIN, P.L.C.

(57) ABSTRACT

The solid electrolyte material of the present disclosure includes Li, M, O, X, and F. M is at least one element selected from the group consisting of Ta and Nb. X is at least one element selected from the group consisting of Cl, Br, and I.

9 Claims, 6 Drawing Sheets

SOLID ELECTROLYTE MATERIAL AND BATTERY USING SAME

BACKGROUND

1. Technical Field

The present disclosure relates to a solid electrolyte material and a battery using it.

2. Description of the Related Art

Japanese Unexamined Patent Application Publication No. 2011-129312 (PTL 1) discloses an all solid battery using a sulfide solid electrolyte material.

SUMMARY

One non-limiting and exemplary embodiment provides a solid electrolyte material having a high lithium ion conductivity.

In one general aspect, the techniques disclosed here feature a solid electrolyte material including Li, M, O, X, and F, wherein M is at least one element selected from the group consisting of Ta and Nb, and X is at least one element selected from the group consisting of Cl, Br, and I.

The present disclosure provides a solid electrolyte material having a high lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
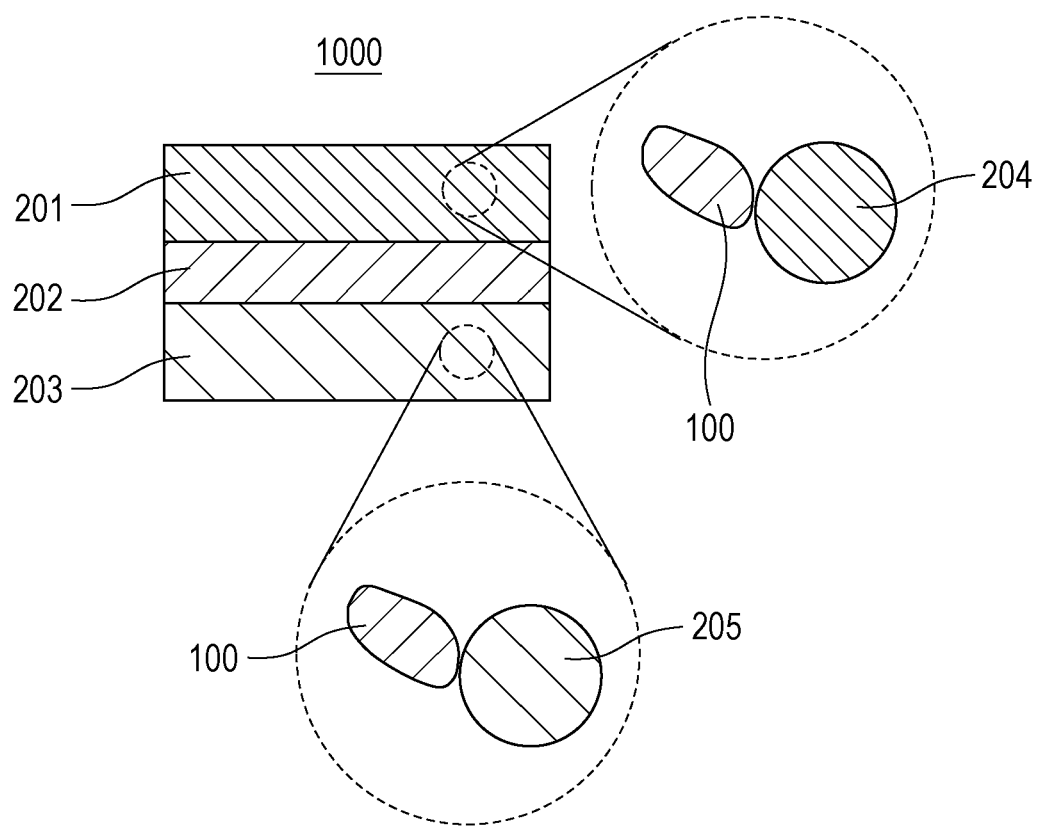
FIG. 1 is a cross-sectional view of a battery 1000 according to a second embodiment.

Embodiments of the present disclosure will now be described with reference to the drawings.

First Embodiment

The solid electrolyte material according to a first embodiment includes Li, M, O, X, and F. M is at least one element selected from the group consisting of Nb and Ta. X is at least one element selected from the group consisting of Cl, Br, and I.

The solid electrolyte material according to the first embodiment has a high lithium ion conductivity.

The solid electrolyte material according to the first embodiment may be used for obtaining a battery having excellent charge and discharge characteristics.

The solid electrolyte material according to the first embodiment can maintain a high lithium ion conductivity in an assumed battery operating temperature range (e.g., a range from −30° C. to 80° C.). Accordingly, the battery using the solid electrolyte material according to the first embodiment can stably operate even in an environment with temperature changes.

From the viewpoint of safety, the solid electrolyte material according to the first embodiment desirably does not contain sulfur. A solid electrolyte material not containing sulfur does not generate hydrogen sulfide, even if it is exposed to the atmosphere, and is therefore excellent in safety. It should be kept in mind that hydrogen sulfide may be generated when the sulfide solid electrolyte material disclosed in PTL 1 is exposed to the atmosphere.

In order to enhance the ion conductivity of the solid electrolyte material, the solid electrolyte material according to the first embodiment may consist essentially of Li, M, O, X, and F. Here, the phrase "the solid electrolyte material according to the first embodiment consists essentially of Li, M, O, X, and F" means that the molar proportion of the sum of the amounts of Li, M, O, X, and F to the sum of the amounts of all elements constituting the solid electrolyte material according to the first embodiment is 90% or more. As an example, the molar proportion may be 95% or more.

In order to enhance the ion conductivity of the solid electrolyte material, the solid electrolyte material according to the first embodiment may consist of Li, M, O, X, and F only.

In order to enhance the ion conductivity of the solid electrolyte material, in the solid electrolyte material according to the first embodiment, X may include Cl. Desirably, X may be Cl.

In an X-ray diffraction pattern, the solid electrolyte material according to the first embodiment may contain a first crystal phase having a peak within a first range in which the value of diffraction angle 2θ is 13.7° or more and 14.8° or less. The peak may be present within a range of, for example, 13.7° or more and 13.96° or less.

The first crystal phase has a high lithium ion conductivity. The solid electrolyte material according to the first embodiment is likely to form a path for diffusing lithium ions by containing the first crystal phase. As a result, the solid electrolyte material according to the first embodiment has a high lithium ion conductivity.

The X-ray diffraction pattern of the solid electrolyte material according to the first embodiment may be obtained by X-ray diffraction measurement by a θ-2θ method using Cu-Kα rays (wavelength: 1.5405 angstrom and 1.5444 angstrom, i.e., wavelength: 0.15405 nm and 0.15444 nm).

The diffraction angle of the peak in the X-ray diffraction pattern is defined as the angle showing the maximum intensity of a mountain-shaped portion where the value of SN ratio (i.e., the ratio of a signal S to a background noise N) is 3 or more and the half-value width is 10° or less. The half-value width is the width represented by the difference between two diffraction angles where the intensity is half the value of $I_{MAX}$, $I_{MAX}$ being the maximum intensity of the X-ray diffraction peak.

The X-ray diffraction pattern of the solid electrolyte material according to the first embodiment may further include a peak resulting from the first crystal phase within a second range in which the diffraction angle 2θ is 24.0° or more and 25.3° or less. The peak may be present within a range of, for example, 24.84° or more and 24.98° or less. Such a first crystal phase has a higher lithium ion conductivity. Accordingly, the solid electrolyte material containing the first crystal phase has a higher lithium ion conductivity.

In the solid electrolyte material according to the first embodiment, the molar proportion of F to the sum of X and F may be 1% or more and 50% or less. The molar proportion of F to the sum of X and F is calculated by a mathematical expression: {(amount of F)/[(the sum of amounts of all elements constituting X)+(amount of F)]}×100. Hereinafter, the molar proportion of F to the sum of X and F is mentioned as "molar proportion F/(X+F)".

The solid electrolyte material according to the first embodiment contains fluorine and therefore has high reduction resistance. That is, the solid electrolyte material according to the first embodiment has a high resistance to reduction. When the molar proportion F/(X+F) is 1% or more and 50% or less, the solid electrolyte material according to the first embodiment can improve the reduction resistance while maintaining a high ion conductivity. That is, the solid electrolyte material according to the first embodiment has both a high ion conductivity and high reduction resistance by the configuration in which the molar proportion F/(X+F) is 1% or more and 50% or less.

In order to further enhance the ion conductivity of the solid electrolyte material, in the solid electrolyte material according to the first embodiment, the molar proportion F/(X+F) may be 1% or more and 10% or less. For example, the molar proportion F/(X+F) may be 1% or more and 4% or less.

In order to further enhance the reduction resistance of the solid electrolyte material, in the solid electrolyte material according to the first embodiment, the molar proportion F/(X+F) may be 10% or more and 50% or less.

In order to further enhance the ion conductivity of the solid electrolyte material, the solid electrolyte material according to the first embodiment may further include a second crystal phase that is different from the first crystal phase. That is, the solid electrolyte material according to the first embodiment may further include a second crystal phase including a peak at a diffraction angle 2θ different from the peak of the first crystal phase, in the above-mentioned X-ray diffraction pattern. When the solid electrolyte material according to the first embodiment not only includes the first crystal phase but also further includes the second crystal phase, it is thought that the conduction of lithium ions between first crystal phases is facilitated by the second crystal phase. Consequently, the lithium ion conductivity is further improved.

The shape of the solid electrolyte material according to the first embodiment is not limited. Examples of the shape are needle, spherical, and oval spherical shapes. The solid electrolyte material according to the first embodiment may be a particle. The solid electrolyte material according to the first embodiment may be formed so as to have a pellet shape or a planar shape.

When the solid electrolyte material according to the first embodiment has a particulate shape (e.g., spherical), the solid electrolyte material may have a median diameter of 0.1 μm or more and 100 μm or less or a median diameter of 0.5 μm or more and 10 μm or less. Consequently, the solid electrolyte material according to the first embodiment and other materials may be well dispersed. The median diameter of particles means the particle size (d50) corresponding to the volume accumulation of 50% in a volume-based particle size distribution. The volume-based particle size distribution may be measured with a laser diffraction measurement apparatus or an image analyzer.

When the solid electrolyte material according to the first embodiment has a particulate shape (e.g., spherical), the solid electrolyte material may have a median diameter smaller than that of an active material. Consequently, the solid electrolyte material according to the first embodiment and the active material can form a good dispersion state.

Method for Manufacturing Solid Electrolyte Material

The solid electrolyte material according to the first embodiment may be manufactured by the following method.

Raw material powders are prepared so as to have a desired composition. The raw material powders are, for example, an oxide, a hydroxide, a halide, and an acid halide.

As an example, in a solid electrolyte material constituted of Li, M, O, X, and F, when M is Ta, X is Cl, and molar ratios Li/M, O/(F+X), and F/(F+X) at the time of mixing the raw materials are 1.0, 0.2, and 0.1, respectively, $Li_2O_2$, $TaCl_5$, and $TaF_5$ are mixed such that the molar ratio of $Li_2O_2$:$TaCl_5$:$TaF_5$ is 1:1.8:0.2. M and X are determined by selection of the raw material powders. The molar ratios of Li/M, O/(F+X), and F/(F+X) are determined by selecting the mixing ratio of the raw material powders.

A mixture of the raw material powders is mechanochemically reacted (by a mechanochemical milling method) to allow the raw materials to react with each other in a mixing apparatus such as a planetary ball mill to obtain a reaction product. The reaction product may be heat-treated in vacuum or in an inert atmosphere. Alternatively, the mixture may be heat-treated in vacuum or in an inert gas atmosphere to obtain a reaction product. The solid electrolyte material according to the first embodiment is obtained by these methods. The inert atmosphere is, for example, an argon atmosphere or a nitrogen atmosphere.

In some cases, a part of M or a part of X evaporates by heat-treating of the solid electrolyte material. As a result, the values of the molar proportion Li/M and the molar proportion O/(F+X) of the resulting solid electrolyte material may be larger than the values calculated from the molar ratio of the prepared raw material powders. Specifically, the molar proportion Li/M may be increased by about 20%, and the molar proportion O/(F+X) may be increased by about 40% to 75%.

The position of the X-ray diffraction peak in the solid electrolyte material according to the first embodiment, i.e., the structure of the crystal phase, may be adjusted to a desired one by selecting the raw material powders, mixing ratio of the raw material powders, and reaction conditions.

The composition of the solid electrolyte material is determined by, for example, an ICP emission spectral analysis, ion chromatography, inert gas melting-infrared absorption method, or electron probe micro analysis (EPMA).

Second Embodiment

A second embodiment will now be described. The matters described in the first embodiment will be omitted as appropriate.

The battery according to the second embodiment includes a positive electrode, an electrolyte layer, and a negative electrode. The electrolyte layer is disposed between the positive electrode and the negative electrode. At least one selected from the group consisting of the positive electrode, the electrolyte layer, and the negative electrode contains the solid electrolyte material according to the first embodiment.

The battery according to the second embodiment has excellent charge and discharge characteristics.

FIG. 1 is a cross-sectional view of a battery 1000 according to the second embodiment.

The battery 1000 includes a positive electrode 201, an electrolyte layer 202, and a negative electrode 203. The electrolyte layer 202 is disposed between the positive electrode 201 and the negative electrode 203.

The positive electrode 201 contains a positive electrode active material particle 204 and a solid electrolyte particle 100.

The electrolyte layer 202 contains an electrolyte material. The electrolyte material is, for example, a solid electrolyte material.

The negative electrode 203 contains a negative electrode active material particle 205 and a solid electrolyte particle 100.

The solid electrolyte particle 100 is a particle including the solid electrolyte material according to the first embodiment. The solid electrolyte particle 100 may be a particle including the solid electrolyte material according to the first embodiment as a main component. The particle including the solid electrolyte material according to the first embodiment as a main component means a particle in which the most abundant component is the solid electrolyte material according to the first embodiment. The solid electrolyte particle 100 may be a particle consisting of the solid electrolyte material according to the first embodiment.

The positive electrode 201 contains a material that can occlude and release metal ions such as lithium ions. The positive electrode 201 contains, for example, a positive electrode active material (e.g., the positive electrode active material particle 204).

Examples of the positive electrode active material are a lithium-containing transition metal oxide, a transition metal fluoride, a polyanionic material, a fluorinated polyanionic material, a transition metal sulfide, a transition metal oxysulfide, and a transition metal oxynitride. Examples of the lithium-containing transition metal oxide are Li(NiCoAl)O$_2$, Li(NiCoMn)O$_2$, and LiCoO$_2$.

From the cost and safety of the battery, lithium phosphate may be used as the positive electrode active material.

When the positive electrode 201 contains the solid electrolyte material according to the first embodiment wherein X includes I (i.e., iodine), lithium iron phosphate may be used as the positive electrode active material. The solid electrolyte material according to the first embodiment including I is likely to be oxidized. The oxidation reaction of the solid electrolyte material is suppressed by using lithium iron phosphate as the positive electrode active material. That is, formation of an oxide layer having a low lithium ion conductivity is suppressed. As a result, the battery has a high charge and discharge efficiency.

The positive electrode 201 may contain not only the solid electrolyte material according to the first embodiment but also a transition metal oxyfluoride as the positive electrode active material. The solid electrolyte material according to the first embodiment is unlikely to form a resistive layer even if it is fluorinated by a transition metal fluoride. As a result, the battery has a high charge and discharge efficiency.

The transition metal oxyfluoride contains oxygen and fluorine. As an example, the transition metal oxyfluoride may be a compound represented by a composition formula: Li$_p$Me$_q$O$_m$F$_n$. Here, Me is at least one element selected from the group consisting of Mn, Co, Ni, Fe, Al, Cu, V, Nb, Mo, Ti, Cr, Zr, Zn, Na, K, Ca, Mg, Pt, Au, Ag, Ru, W, B, Si, and P and satisfies the following mathematical expressions: $0.5 \leq p \leq 1.5$, $0.5 \leq q \leq 1.0$, $1 \leq m < 2$, and $0 < n \leq 1$. An example of the transition metal oxyfluoride is Li$_{1.05}$(Ni$_{0.35}$Co$_{0.35}$Mn$_{0.3}$)$_{0.95}$O$_{1.9}$F$_{0.1}$.

The positive electrode active material particle 204 may have a median diameter of 0.1 μm or more and 100 μm or less. When the positive electrode active material particle 204 has a median diameter of 0.1 μm or more, the positive electrode active material particle 204 and the solid electrolyte particle 100 can form a good dispersion state in the positive electrode 201. Consequently, the charge and discharge characteristics of the battery are improved. When the positive electrode active material particle 204 has a median diameter of 100 μm or less, the lithium diffusion speed in the positive electrode active material particle 204 is improved. Consequently, the battery may operate at a high output.

The positive electrode active material particle 204 may have a median diameter larger than that of the solid electrolyte particle 100. Consequently, the positive electrode active material particle 204 and the solid electrolyte particle 100 can form a good dispersion state.

From the viewpoint of the energy density and the output of the battery, in the positive electrode 201, the ratio of the volume of the positive electrode active material particle 204 to the sum of the volume of the positive electrode active material particle 204 and the volume of the solid electrolyte particle 100 may be 0.30 or more and 0.95 or less.

Figure 2:
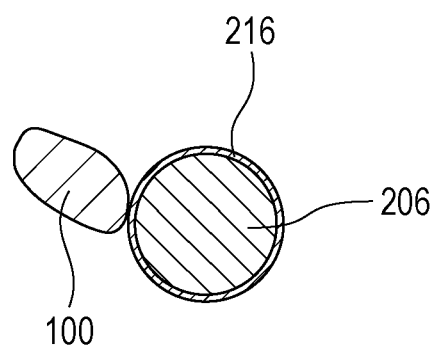
FIG. 2 is a cross-sectional view of an electrode material 1100 according to the second embodiment.

FIG. 2 is a cross-sectional view of an electrode material 1100 according to the second embodiment. The electrode material 1100 is included in, for example, the positive electrode 201. In order to prevent the electrode active material particle 206 from reacting with the solid electrolyte particle 100, a coating layer 216 may be formed on the surface of the electrode active material particle 206. Consequently, an increase in the reaction overvoltage of the battery can be inhibited. Examples of the coating material included in the coating layer 216 are a sulfide solid electrolyte, an oxide solid electrolyte, and a halide solid electrolyte.

When the solid electrolyte particle 100 is a sulfide solid electrolyte, the coating material may be the solid electrolyte material according to the first embodiment wherein X is at least one element selected from the group consisting of Cl and Br. Such the solid electrolyte material according to the first embodiment is unlikely to be oxidized compared to the sulfide solid electrolyte. As a result, an increase in the reaction overvoltage of the battery can be inhibited.

When the solid electrolyte particle 100 is the solid electrolyte material according to the first embodiment wherein X includes I, the coating material may be the solid electrolyte material according to the first embodiment wherein X is at least one element selected from the group consisting of Cl and Br. The solid electrolyte material according to the first embodiment not containing I is unlikely to be oxidized compared to the solid electrolyte material according to the first embodiment containing I. As a result, the battery has a high charge and discharge efficiency.

Where the solid electrolyte particle 100 is the solid electrolyte material according to the first embodiment wherein X includes I, the coating material may include an oxide solid electrolyte. The oxide solid electrolyte may be lithium niobate which has excellent stability even at a high potential. Consequently, the battery has a high charge and discharge efficiency.

The positive electrode 201 may be composed of a first positive electrode layer containing a first positive electrode active material and a second positive electrode layer containing a second positive electrode active material. Here, the second positive electrode layer is disposed between the first positive electrode layer and the electrolyte layer 202. The first positive electrode layer and the second positive electrode layer contain the solid electrolyte material according to the first embodiment including I, and the coating layer 216 is formed on the surface of the second positive electrode active material. According to the configuration above, the solid electrolyte material according to the first embodiment included in the electrolyte layer 202 can be prevented from being oxidized by the second positive electrode active material. As a result, the battery has a large charging capacity. Examples of the coating material included in the coating layer 206 are a sulfide solid electrolyte, an oxide solid electrolyte, a polymer solid electrolyte, and a halide solid electrolyte. However, when the coating material is a halide solid electrolyte, I is not included as the halogen element. The first positive electrode active material may be the same material as the second positive electrode active material or may be a material that is different from the second positive electrode active material.

From the viewpoint of the energy density and the output of the battery, the positive electrode 201 may have a thickness of 10 μm or more and 500 μm or less.

The electrolyte layer 202 contains an electrolyte material. The electrolyte material is, for example, a solid electrolyte material. The electrolyte layer 202 may be a solid electrolyte layer. The solid electrolyte material included in the electrolyte layer 202 may contain the solid electrolyte material according to the first embodiment. The solid electrolyte material included in the electrolyte layer 202 may consist of the solid electrolyte material according to the first embodiment only.

The solid electrolyte material included in the electrolyte layer 202 may be constituted of only a solid electrolyte material that is different from the solid electrolyte material according to the first embodiment. Examples of the solid electrolyte material that is different from the solid electrolyte material according to the first embodiment are $Li_2MgX'_4$, $Li_2FeX'_4$, $Li(Al, Ga, In)X'_4$, $Li_3(Al, Ga, In)X'_6$, and LiI. Here, X' is at least one element selected from the group consisting of F, Cl, Br, and I.

Hereinafter, the solid electrolyte material according to the first embodiment is referred to as first solid electrolyte material. The solid electrolyte material that is different from the solid electrolyte material according to the first embodiment is referred to as second solid electrolyte material.

The electrolyte layer 202 may contain not only the first solid electrolyte material but also the second solid electrolyte material. The first solid electrolyte material and the second solid electrolyte material may be uniformly dispersed.

The electrolyte layer 202 may have a thickness of 1 μm or more and 100 μm or less. When the electrolyte layer 202 has a thickness of 1 μm or more, the positive electrode 201 and the negative electrode 203 are unlikely to be short-circuited. When the electrolyte layer 202 has a thickness of 100 μm or less, the battery may operate at a high output.

Another electrolyte layer may be further disposed between the electrolyte layer 202 and the negative electrode 203. For example, when the electrolyte layer 202 includes the first solid electrolyte material, in order to maintain the high ion conductivity of the solid electrolyte material more stably, an electrolyte layer constituted of another solid electrolyte material that is more electrochemically stable than the solid electrolyte material may be further disposed.

The negative electrode 203 contains a material that can occlude and release metal ions (e.g., lithium ions). The negative electrode 203 contains, for example, a negative electrode active material (e.g., the negative electrode active material particle 205).

Examples of the negative electrode active material are a metal material, a carbon material, an oxide, a nitride, a tin compound, and a silicon compound. The metal material may be a single metal or an alloy. Examples of the metal material are a lithium metal and a lithium alloy. Examples of the carbon material are natural graphite, coke, graphitizing carbon, carbon fibers, spherical carbon, artificial graphite, and amorphous carbon. From the viewpoint of capacity density, suitable examples of the negative electrode active material are silicon (i.e., Si), tin (i.e., Sn), a silicon compound, and a tin compound.

The negative electrode active material may be selected based on the resistance to reduction of the solid electrolyte material included in the negative electrode 203. When the negative electrode 203 contains the first solid electrolyte material, a material that can occlude and release lithium ions with respect to lithium at 0.27 V or higher may be used as the negative electrode active material. When the negative electrode active material is such a material, the first solid electrolyte material included in the negative electrode 203 can be prevented from being reduced. As a result, the battery has a high charge and discharge efficiency. Examples of the material are titanium oxide, an indium metal, and a lithium alloy. Examples of the titanium oxide are $Li_4Ti_5O_{12}$, $LiTi_2O_4$, and $TiO_2$.

The negative electrode active material particle 205 may have a median diameter of 0.1 μm or more and 100 μm or less. When the negative electrode active material particle 205 has a median diameter of 0.1 μm or more, the negative electrode active material particle 205 and the solid electrolyte particle 100 can form a good dispersion state in the negative electrode 203. Consequently, the charge and discharge characteristics of the battery are improved. When the negative electrode active material particle 205 has a median diameter of 100 μm or less, the lithium diffusion speed in the negative electrode active material particle 205 is improved. Consequently, the battery may operate at a high output.

The negative electrode active material particle 205 may have a median diameter larger than that of the solid electrolyte particle 100. Consequently, the negative electrode active material particle 205 and the solid electrolyte particle 100 can form a good dispersion state.

From the viewpoint of the energy density and the output of the battery, in the negative electrode 203, the ratio of the volume of the negative electrode active material particle 205 to the sum of the volume of the negative electrode active material particle 205 and the volume of the solid electrolyte particle 100 may be 0.30 or more and 0.95 or less.

The electrode material 1100 shown in FIG. 2 may be contained in the negative electrode 203. In order to prevent the solid electrolyte particle 100 from reacting with the negative electrode active material (i.e., the electrode active material particle 206), a coating layer 216 may be formed on the surface of the electrode active material particle 206. Consequently, the battery has a high charge and discharge efficiency. Examples of the coating material included in the coating layer 216 are a sulfide solid electrolyte, an oxide solid electrolyte, a polymer solid electrolyte, and a halide solid electrolyte.

When the solid electrolyte particle 100 is the first solid electrolyte material, the coating material may be a sulfide solid electrolyte, an oxide solid electrolyte, or a polymer solid electrolyte. An example of the sulfide solid electrolyte is $Li_2S—P_2S_5$. An example of the oxide solid electrolyte is trilithium phosphate. An example of the polymer solid electrolyte is a composite compound of polyethylene oxide and a lithium salt. An example of such the polymer solid electrolyte is lithium bis(trifluoromethanesulfonyl)imide.

From the viewpoint of the energy density and the output of the battery, the negative electrode 203 may have a thickness of 10 μm or more and 500 μm or less.

At least one selected from the positive electrode 201, the electrolyte layer 202, and the negative electrode 203 may contain the second solid electrolyte material for the purpose of enhancing the ion conductivity. Examples of the second solid electrolyte material are a sulfide solid electrolyte, an oxide solid electrolyte, a halide solid electrolyte, and an organic polymer solid electrolyte.

In the present disclosure, the term "sulfide solid electrolyte" means a solid electrolyte containing sulfur. The term "oxide solid electrolyte" means a solid electrolyte containing oxygen. The oxide solid electrolyte may contain an anion (however, a sulfur anion and halogen anions are excluded) other than oxygen. The term "halide solid electrolyte" means a solid electrolyte containing a halogen element and not containing sulfur. The halide solid electrolyte may contain not only a halogen element but also oxygen.

Examples of the sulfide solid electrolyte are $Li_2S—P_2S_5$, $Li_2S—SiS_2$, $Li_2S—B_2S_3$, $Li_2S—GeS_2$, $Li_{3.25}Ge_{0.25}P_{0.75}S_4$, and $Li_{10}GeP_2S_{12}$.

Examples of the oxide solid electrolyte are:
(i) an NASICON-type solid electrolyte, such as $LiTi_2(PO_4)_3$ or its element substitute;
(ii) a perovskite-type solid electrolyte, such as (LaLi)$TiO_3$;
(iii) an LISICON-type solid electrolyte, such as $Li_{14}ZnGe_4O_{16}$, $Li_4SiO_4$, $LiGeO_4$, or its element substitute;
(iv) a garnet-type solid electrolyte, such as $Li_7La_3Zr_2O_{12}$ or its element substitute; and
(v) $Li_3PO_4$ or its N-substitute.

An example of the halide solid electrolyte is a compound represented by $Li_aMe'_bY_cZ_6$. Here, mathematical expressions: a+mb+3c=6 and c>0 are satisfied. Me' is at least one selected from the group consisting of metal elements and metalloid elements excluding Li and Y. Z is at least one element selected from the group consisting of F, Cl, Br, and I. The value of m represents the valence of Me'.

The "metalloid elements" are B, Si, Ge, As, Sb, and Te. The "metal elements" are all elements included in Groups 1 to 12 of the periodic table (however, hydrogen is excluded) and all elements included in Groups 13 to 16 in the periodic table (however, B, Si, Ge, As, Sb, Te, C, N, P, O, S, and Se are excluded). Me' may be at least one element selected from the group consisting of Mg, Ca, Sr, Ba, Zn, Sc, Al, Ga, Bi, Zr, Hf, Ti, Sn, Ta, and Nb.

Examples of the halide solid electrolyte are $Li_3YCl_6$ and $Li_3YBr_6$.

When the electrolyte layer 202 contains the first solid electrolyte material, the negative electrode 203 may contain a sulfide solid electrolyte. Consequently, the sulfide solid electrolyte electrochemically stable to the negative electrode active material prevents the first solid electrolyte material and the negative electrode active material from being brought into contact with each other. As a result, the battery has a low internal resistance.

Examples of the organic polymer solid electrolyte are a compound of a polymer compound and a lithium salt. The polymer compound may have an ethylene oxide structure. A polymer compound having an ethylene oxide structure can contain a large amount of a lithium salt and therefore has a higher ion conductivity.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these salts may be used alone. Alternatively, a mixture of two or more lithium salts selected from these salts may be used.

At least one selected from the group consisting of the positive electrode 201, the electrolyte layer 202, and the negative electrode 203 may contain a nonaqueous electrolyte liquid, a gel electrolyte, or an ionic liquid for the purpose of facilitating the transfer of lithium ions and improving the output characteristics of the battery.

The nonaqueous electrolyte liquid includes a nonaqueous solvent and a lithium salt dissolved in the nonaqueous solvent. Examples of the nonaqueous solvent are a cyclic carbonate ester solvent, a chain carbonate ester solvent, a cyclic ether solvent, a chain ether solvent, a cyclic ester solvent, a chain ester solvent, and a fluorine solvent. Examples of the cyclic carbonate ester solvent are ethylene carbonate, propylene carbonate, and butylene carbonate. Examples of the chain carbonate ester solvent are dimethyl carbonate, ethyl methyl carbonate, and diethyl carbonate. Examples of the cyclic ether solvent are tetrahydrofuran, 1,4-dioxane, and 1,3-dioxolane. Examples of the chain ether solvent are 1,2-dimethoxyethane and 1,2-diethoxyethane. An example of the cyclic ester solvent is γ-butyrolactone. An example of the chain ester solvent is ethyl acetate. Examples of the fluorine solvent are fluoroethylene carbonate, methyl fluoropropionate, fluorobenzene, fluoroethyl methyl carbonate, and fluorodimethylene carbonate. One nonaqueous solvent selected from these solvents may be used alone. Alternatively, a mixture of two or more nonaqueous solvents selected from these solvents may be used.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these lithium salts may be used alone. Alternatively, a mixture of two or more lithium salts selected from these lithium salts may be used. The concentration of the lithium salt is within a range, for example, 0.5 mol/L or more and 2 mol/L or less.

As the gel electrolyte, a polymer material impregnated with a nonaqueous electrolyte liquid may be used. Examples of the polymer material are polyethylene oxide, polyacrylonitrile, polyvinylidene fluoride, polymethyl methacrylate, and a polymer having an ethylene oxide bond.

Examples of the cation included in the ionic liquid are:
(i) an aliphatic chain quaternary salt, such as tetraalkylammonium and tetraalkylphosphonium;
(ii) aliphatic cyclic ammonium, such as pyrrolidiniums, morpholiniums, imidazoliniums, tetrahydropyrimidiniums, piperaziniums, and piperidiniums; and
(iii) a nitrogen-containing heterocyclic aromatic cation, such as pyridiniums and imidazoliums.

Examples of the anion included in the ionic liquid are $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$.

The ionic liquid may contain a lithium salt.

At least one selected from the positive electrode 201, the electrolyte layer 202, and the negative electrode 203 may contain a binder for the purpose of improving the adhesion between individual particles.

Examples of the binder are polyvinylidene fluoride, polytetrafluoroethylene, polyethylene, polypropylene, an aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, styrene butadiene rubber, and carboxymethyl cellulose. A copolymer may be used as the binder. Examples of such the binder are copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above-mentioned materials may be used.

At least one selected from the positive electrode 201 and the negative electrode 203 may contain a conductive assistant for the purpose of enhancing the electron conductivity.

Examples of the conductive assistant are:
(i) graphites, such as natural graphite and artificial graphite;
(ii) carbon blacks, such as acetylene black and Ketjen black;
(iii) conductive fibers, such as carbon fibers and metal fibers;
(iv) carbon fluoride;
(v) metal powders, such as aluminum;
(vi) conductive whiskers, such as zinc oxide and potassium titanate;
(vii) a conductive metal oxide, such as titanium oxide; and
(viii) a conductive polymer compound, such as polyanion, polypyrrole, and polythiophene.

In order to reduce the cost, the conductive assistant of the above (i) or (ii) may be used.

Examples of the shape of the battery according to the second embodiment are coin type, cylindrical type, square type, sheet type, button type, flat type, and laminated type.

EXAMPLES

The present disclosure will now be described in more detail using Examples.

Example 1

Production of Solid Electrolyte Material $Li_2O_2$, $TaCl_5$, and $TaF_5$ were prepared as the raw material powders such that the molar ratio of $Li_2O_2:TaCl_5:TaF_5$ was 1:1.9:0.1 in a dry atmosphere having a dew point of −30° C. or less (hereinafter referred to as "dry atmosphere"). These raw material powders were pulverized and mixed in a mortar to obtain a mixture powder. The resulting mixture powder was milled with a planetary ball mill (manufactured by Fritsch GmbH, model P-7) at 600 rpm for 24 hours. Subsequently, the mixture powder was heat-treated at 200° C. for 6 hours. Thus, a solid electrolyte material powder of Example 1 containing a crystal phase consisting of Li, Ta, O, Cl, and F was obtained.

Evaluation of Ion Conductivity

Figure 3:
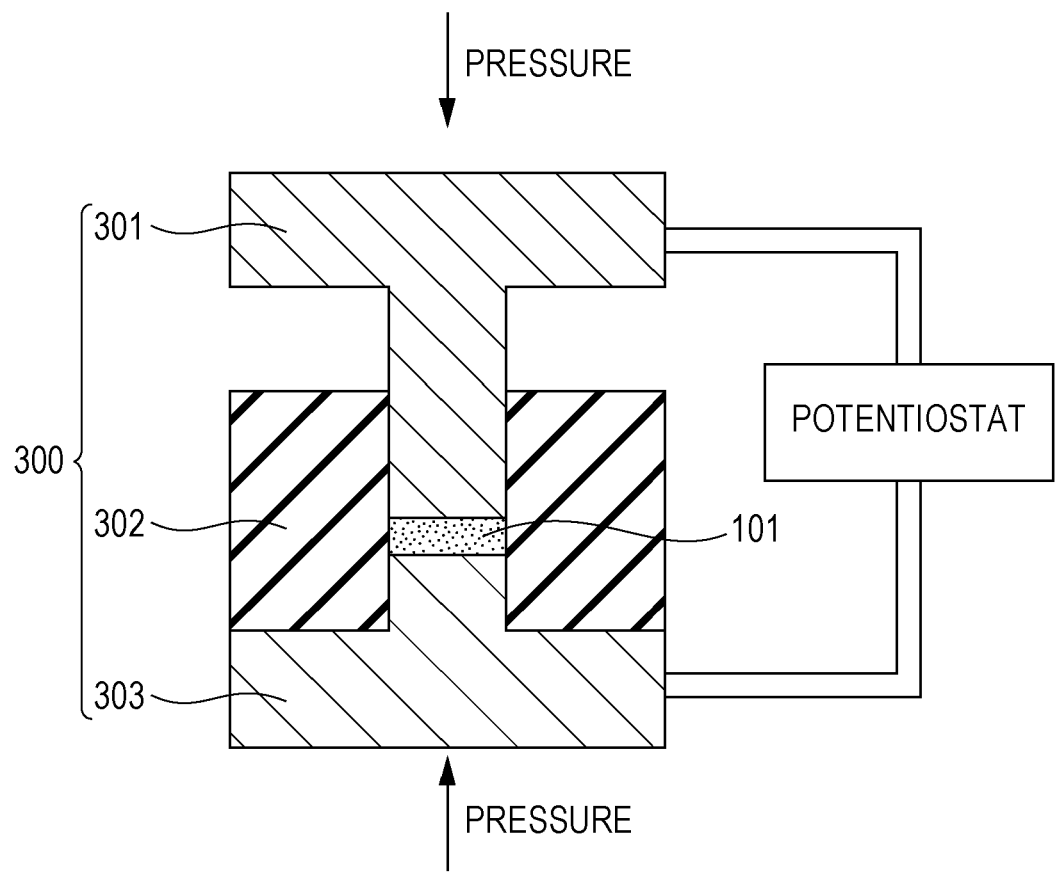
FIG. 3 is a schematic view of a compression molding dies 300 used for evaluation of the ion conductivity of a solid electrolyte material.

FIG. 3 is a schematic view of a compression molding dies 300 used for evaluation of the ion conductivity of a solid electrolyte material.

The compression molding dies 300 included a punch upper part 301, a die 302, and a punch lower part 303. The die 302 was formed from insulating polycarbonate. The punch upper part 301 and the punch lower part 303 were both formed from electron-conductive stainless steel.

The ion conductivity of the solid electrolyte material of Example 1 was measured using the compression molding dies 300 shown in FIG. 3 by the following method.

The powder of the solid electrolyte material of Example 1 (i.e., the powder 101 of the solid electrolyte material in FIG. 3) was loaded inside the compression molding dies 300 in a dry atmosphere. A pressure of 300 MPa was applied to the solid electrolyte material of Example 1 inside the compression molding dies 300 using the punch upper part 301.

Figure 4:
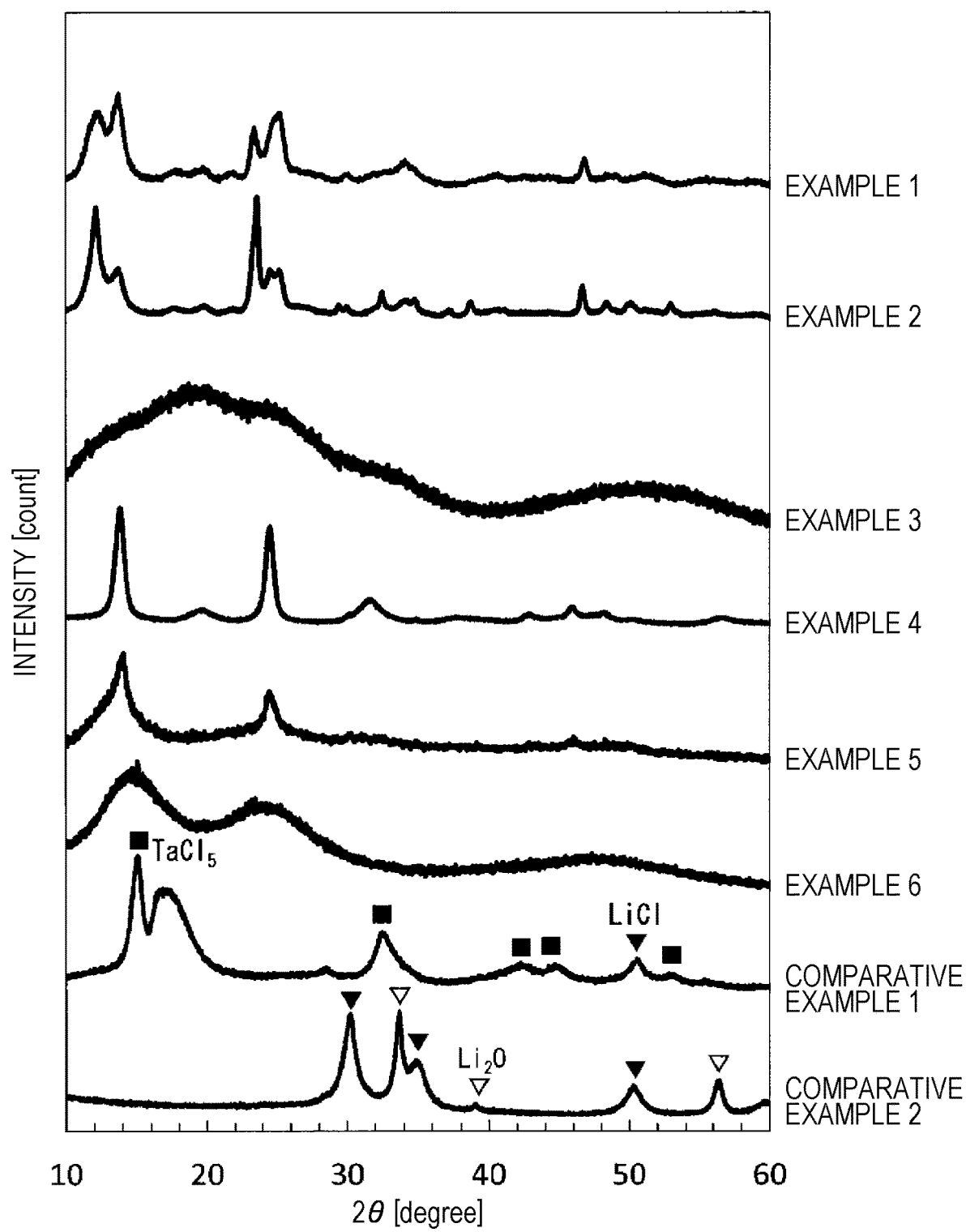
FIG. 4 is a graph showing X-ray diffraction patterns of solid electrolyte materials of Examples 1 to 6 and Comparative Examples 1 and 2.

The compression molding dies 300 was connected to a potentiostat (Princeton Applied Research, VersaSTAT4) equipped with a frequency response analyzer through the punch upper part 301 and the punch lower part 303 while applying the pressure. The punch upper part 301 was connected to the working electrode and the potential measurement terminal. The punch lower part 303 was connected to the counter electrode and the reference electrode. The ion conductivity of the solid electrolyte material of Example 1 was measured by an electrochemical impedance measurement method at room temperature. As a result, the ion conductivity measured at 22° C. was 7.7 mS/cm. X-ray diffraction FIG. 4 is a graph showing an X-ray diffraction pattern of the solid electrolyte material of Example 1. The result shown in FIG. 4 was measured by the following method.

The X-ray diffraction pattern of the solid electrolyte material of Example 1 was measured using an X-ray diffractometer (RIGAKU Corporation, MiniFlex 600) in a dry atmosphere having a dew point of −45° C. or less. As the X-ray source, Cu-Kα rays (wavelength: 1.5405 angstrom and 1.5444 angstrom) were used.

The solid electrolyte material of Example 1 had diffraction peaks at 13.70° (i.e., in the first range) and 25.30° (i.e., in the second range). Accordingly, the solid electrolyte material of Example 1 contained a first crystal phase having a high lithium ion conductivity.

The solid electrolyte material of Example 1 also had a diffraction peak resulting from LiCl. Accordingly, the solid electrolyte material of Example 1 also contained a second crystal phase.

Evaluation of Resistance to Reduction

The resistance to reduction of the solid electrolyte material was evaluated by the voltage of starting the reduction reaction of the solid electrolyte material (hereinafter, referred to as "reduction starting voltage"). The reduction starting voltage of the solid electrolyte material was determined by cyclic voltammetry measurement (hereinafter, referred to as CV measurement).

Figure 6A:
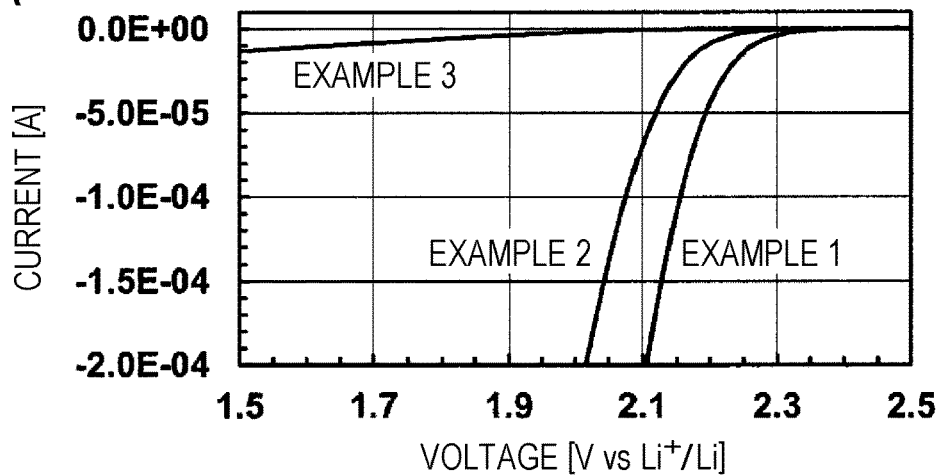
FIG. 6A is a graph showing the results of cyclic voltammetry measurement of the solid electrolyte materials of Examples 1 to 3.

FIG. 6A is a graph showing the result of CV measurement of the solid electrolyte material of Example 1. The result shown in FIG. 6A was measured by the following method.

The solid electrolyte material (120 mg, thickness: 500 μm) of Example 1 and the sulfide solid electrolyte (50 mg) were stacked in this order in an insulating tube having an inner diameter of 9.5 mm to obtain a laminate. As the sulfide solid electrolyte, $Li_2S$—$P_2S_5$ was used. A pressure of 360 MPa was applied to this laminate to form a solid electrolyte layer.

Subsequently, Li metal (thickness: 300 μm) was stacked on the solid electrolyte layer formed from the sulfide solid electrolyte. A pressure of 80 MPa was applied to this laminate.

Subsequently, a current collector formed from stainless steel was disposed on the top and the bottom of the laminate, and a current collecting lead was attached to the current collector.

Thus, a CV measurement cell of Example 1 was obtained.

Figure 6B:
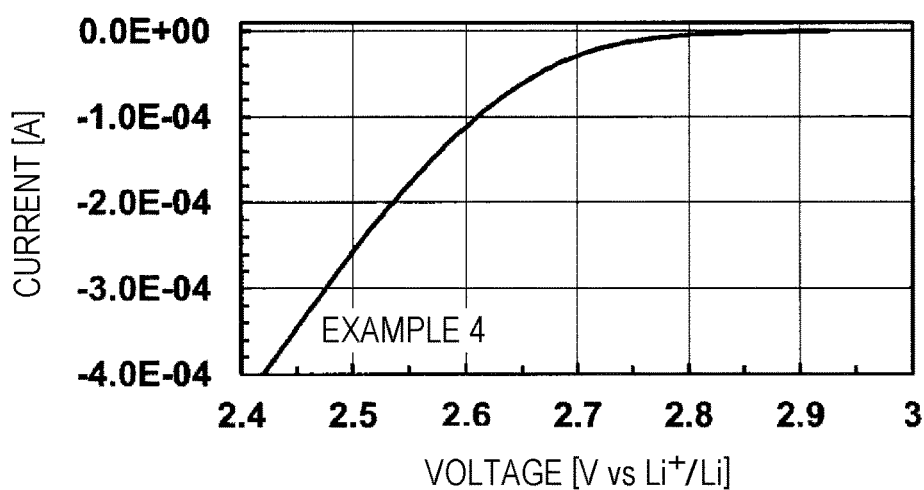
FIG. 6B is a graph showing the results of cyclic voltammetry measurement of the solid electrolyte material of Example 4.
Figure 6C:
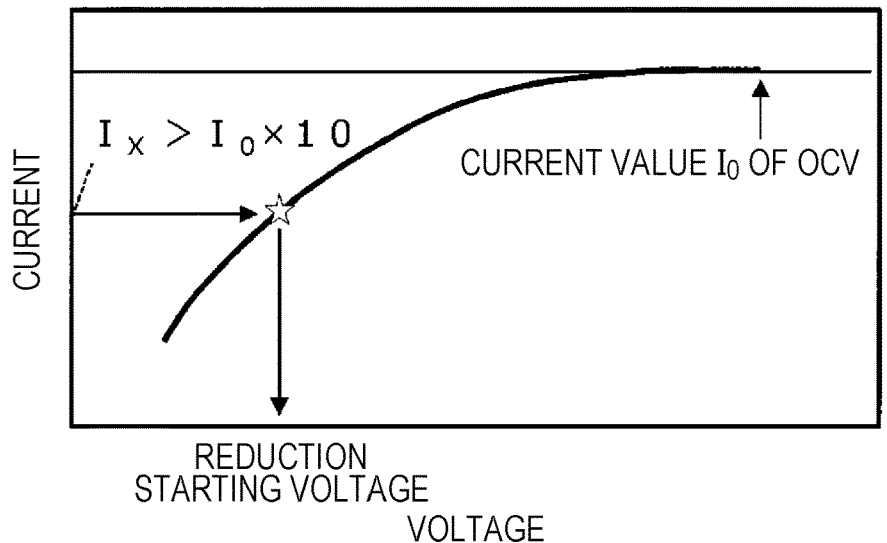
FIG. 6C is a graph for explaining the reduction starting voltage determined from the results of cyclic voltammetry measurement.

The resulting CV measurement cell was placed in a thermostat of 25° C. A voltage was applied to Li at a scanning voltage rate of −2 mV/sec from the open circuit voltage (i.e., OCV) to 0.5 V. If the solid electrolyte material is reduced, a current associated with the reduction reaction is observed. The reduction starting voltage is defined as a voltage at which the current amount Ix is 10 times or more $I_0$ where $I_0$ is the current amount of OCV. Incidentally, in the case of the above measurement method, the current value is a negative value. FIG. 6C is a graph for explaining the reduction starting voltage determined from the results of CV measurement.

In the solid electrolyte material of Example 1, $I_0$ was $3.0 \times 10^{-7}$ A, and the reduction starting voltage was 2.3 V.

Production of Battery

The solid electrolyte material of Example 1 and $LiCoO_2$ serving as the positive electrode active material were prepared at a volume ratio of 50:50 in an argon atmosphere having a dew point of −60° C. or less. These materials were mixed in a mortar to obtain a positive electrode mixture.

The solid electrolyte material of Example 1 (120 mg, thickness: 500 μm) and the above positive electrode mixture (10.6 mg) were stacked in this order in an insulating tube having an inner diameter of 9.5 mm to obtain a laminate. A pressure of 360 MPa was applied to this laminate to form a solid electrolyte layer and a first electrode.

Subsequently, a Li—In alloy having a thickness of 200 μm was stacked on the solid electrolyte layer. A pressure of 80 MPa was applied to this laminate to form a second electrode.

The first electrode was a positive electrode, and the second electrode was a negative electrode.

A current collector formed from stainless steel was attached to the first electrode and the second electrode, and a current collecting lead was attached to the current collector.

Finally, the inside of the insulating tube was isolated from the outside atmosphere using an insulating ferrule to seal the inside of the tube.

Thus, a battery of Example 1 was obtained.

Charge and Discharge Test

Figure 7:
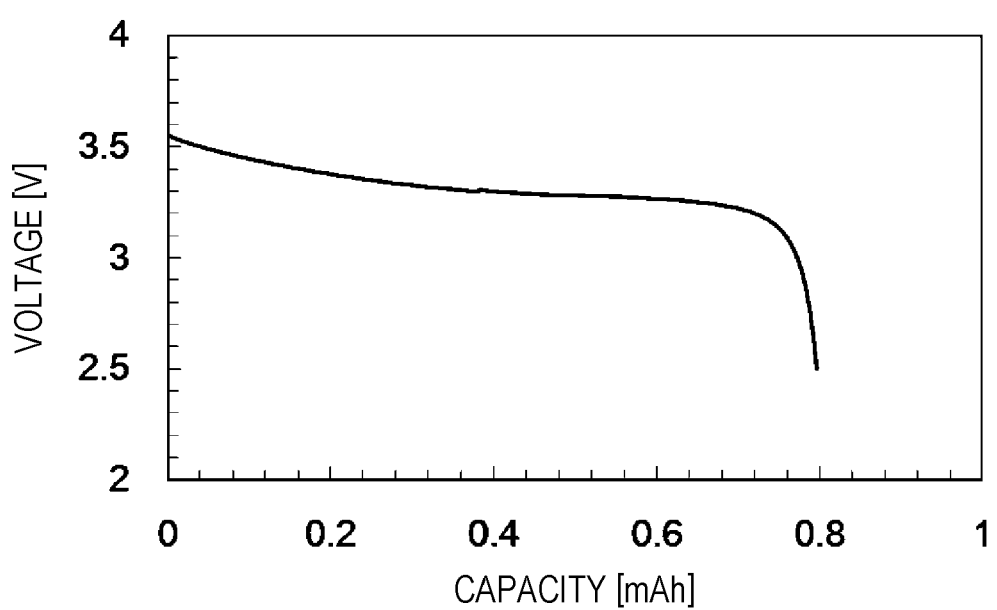
FIG. 7 is a graph showing the initial discharge characteristics of the battery of Example 1.

FIG. 7 is a graph showing the initial discharge characteristics of the battery of Example 1. The result shown in FIG. 7 was measured by the following method.

The battery of Example 1 was placed in a thermostat of 25° C. The battery of Example 1 was charged with a current of 56 μA until the voltage reached 3.6 V. The current density corresponded to 0.05 C rate. Subsequently, the battery was discharged at a current of 56 μA until the voltage reached 2.5 V. The battery of Example 1 was charged and discharged at room temperature.

As the results of the charge and discharge test, the battery of Example 1 had an initial discharge capacity of 0.80 mAh.

Examples 2 to 6

Production of Solid Electrolyte Material

In Example 2, $Li_2O_2$, $TaCl_5$, and $TaF_5$ were prepared as the raw material powders such that the molar ratio of $Li_2O_2:TaCl_5:TaF_5$ was 1:1.8:0.2.

In Example 3, $Li_2O_2$, $TaCl_5$, and $TaF_5$ were prepared as the raw material powders such that the molar ratio of $Li_2O_2:TaCl_5:TaF_5$ was 1:1:1.

In Example 4, $Li_2O_2$, $NbCl_5$, and $NbF_5$ were prepared as the raw material powders such that the molar ratio of $Li_2O_2:NbCl_5:NbF_5$ was 1:1.9:0.1.

In Example 5, $Li_2O_2$, $NbCl_5$, and $NbF_5$ were prepared as the raw material powders such that the molar ratio of $Li_2O_2:NbCl_5:NbF_5$ was 1:1.8:0.2.

In Example 6, $Li_2O_2$, $NbCl_5$, and $NbF_5$ were prepared as the raw material powders such that the molar ratio of $Li_2O_2:NbCl_5:NbF_5$ was 1:1:1.

Solid electrolyte materials of Examples 2 to 6 were obtained as in Example 1 except the above matters.

Example 7

$Li_2O_2$, $TaCl_5$, and $TaF_5$ were prepared as the raw material powders such that the molar ratio of $Li_2O_2:TaCl_5:TaF_5$ was 1:1.98:0.02 in a dry atmosphere having a dew point of −30° C. or less (hereinafter, referred to as "dry atmosphere"). These raw material powders were mixed in a mortar to obtain a mixture powder. The resulting mixture powder was enclosed in a container formed from quartz glass filled with argon gas and was heat-treated at 350° C. for 6 hours. Thus, a powder of a solid electrolyte material of Example 7 containing a crystal phase consisting of Li, Ta, O, Cl, and F was obtained.

Examples 8 to 11

In Example 8, $Li_2O_2$, $TaCl_5$, and $TaF_5$ were prepared as the raw material powders such that the molar ratio of $Li_2O_2:TaCl_5:TaF_5$ was 1:1.96:0.04.

In Example 9, $Li_2O_2$, $TaCl_5$, and $TaF_5$ were prepared as the raw material powders such that the molar ratio of $Li_2O_2:TaCl_5:TaF_5$ was 1:1.94:0.06.

In Example 10, $Li_2O_2$, $TaCl_5$, and $TaF_5$ were prepared as the raw material powders such that the molar ratio of $Li_2O_2:TaCl_5:TaF_5$ was 1:1.92:0.08.

In Example 11, $Li_2O_2$, $TaCl_5$, $NbCl_5$, and $TaF_5$ were prepared as the raw material powders such that the molar ratio of $Li_2O_2:TaCl_5:NbCl_5:TaF_5$ was 1:0.92:1:0.08.

Solid electrolyte materials of Examples 8 to 11 were obtained as in Example 1 except the above matters.

Comparative Examples 1 and 2

In Comparative Example 1, LiCl, $Li_2O_2$, and LiF were prepared as the raw material powders such that the molar ratio of $LiCl:Li_2O_2:LiF$ was 0.9:1:0.1.

In Comparative Example 2, LiCl, $TaCl_5$, and LiF were prepared as the raw material powders such that the molar ratio of $LiCl:TaCl_5:LiF$ was 0.4:1:0.6.

Solid electrolyte materials of Comparative Examples 1 and 2 were obtained as in Example 1 except the above matters.

Evaluation of Ion Conductivity

The ion conductivities of the solid electrolyte materials of Examples 2 to 11 and Comparative Examples 1 and 2 were measured as in Example 1. The measurement results are shown in Tables 1 and 2.

X-Ray Diffraction

Figure 5:
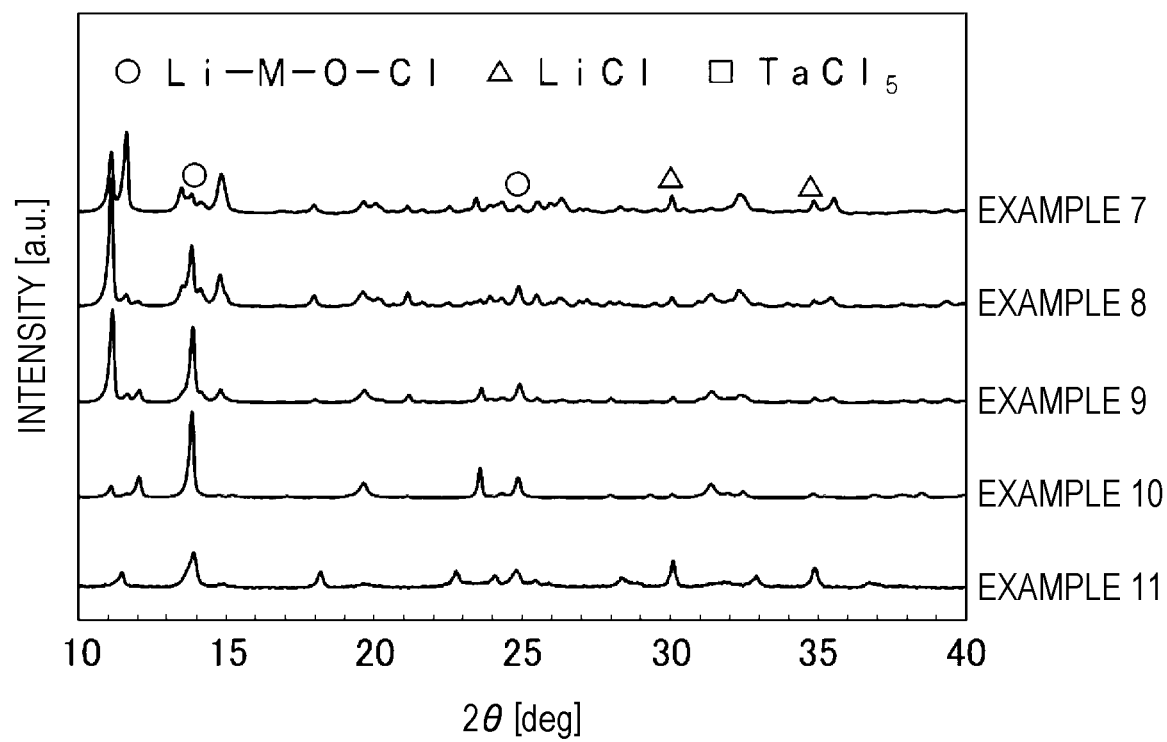
FIG. 5 is a graph showing X-ray diffraction patterns of solid electrolyte materials of Examples 7 to 11.

As in Example 1, the X-ray diffraction patterns of the solid electrolyte materials of Examples 2 to 11 and Comparative Examples 1 and 2 were measured. The measurement results are shown in FIGS. 4 and 5.

The solid electrolyte material of Example 2 had diffraction peaks at 13.74° (i.e., in the first range) and 24.52° (i.e., in the second range). Furthermore, a diffraction peak resulting from LiCl was also observed.

The solid electrolyte material of Example 3 had no diffraction peaks in the first range and the second range.

The solid electrolyte material of Example 4 had diffraction peaks at 13.86° (i.e., in the first range) and 24.55° (i.e., in the second range. Furthermore, a diffraction peak resulting from LiCl was also observed.

The solid electrolyte material of Example 5 had diffraction peaks at 13.96° (i.e., in the first range) and 24.56° (i.e., in the second range). Furthermore, a diffraction peak resulting from LiCl was also observed.

The solid electrolyte material of Example 6 had diffraction peaks at 14.79° (i.e., in the first range) and 24.03° (i.e., in the second range).

The solid electrolyte material of Example 11 had diffraction peaks at 13.90° (i.e., in the first range) and 24.93° (i.e., in the second range). Furthermore, a diffraction peak resulting from LiCl was also observed.

Accordingly, the solid electrolyte materials of Examples 2 and 4 to 11 contained first crystal phases. The solid electrolyte materials of Examples 2, 4, and 5 to 11 contained second crystal phases too.

Evaluation of Resistance to Reduction

The solid electrolyte materials of Examples 2 to 4 were subjected to CV measurement as in Example 1. The measurement results are shown in FIGS. 6A and 6B and Table 1.

In Example 2, $I_0$ was $3.6 \times 10^{-7}$ A, and the reduction starting voltage was 2.2 V.

In Example 3, $I_0$ was $2.6 \times 10^{-7}$ A, and the reduction starting voltage was 2.0 V.

In Example 4, $I_0$ was $5.1 \times 10^{-7}$ A, and the reduction starting voltage was 2.8 V.

TABLE 1

|  | Constituent element | Molar proportion F/(X + F) [%] | Ion conductivity [mS/cm] | Diffraction peak angle in first range | Reduction starting voltage [V] |
| --- | --- | --- | --- | --- | --- |
| Example 1 | Li—O—Ta—Cl—F | 5 | 7.7 | 13.70° | 2.3 |
| Example 2 | Li—O—Ta—Cl—F | 10 | 6.2 | 13.74° | 2.2 |
| Example 3 | Li—O—Ta—Cl—F | 50 | $2.7 \times 10^{-3}$ | — | 2.0 |
| Example 4 | Li—O—Nb—Cl—F | 5 | 7.7 | 13.86° | 2.8 |
| Example 5 | Li—O—Nb—Cl—F | 10 | 8.4 | 13.96° | — |
| Example 6 | Li—O—Nb—Cl—F | 50 | $1.0 \times 10^{-3}$ | 14.79° | — |
| Comparative Example 1 | Li—O—Cl—F | — | $1.4 \times 10^{-5}$ | — | — |
| Comparative Example 2 | Li—Ta—Cl—F | — | $9.2 \times 10^{-4}$ | — | — |

TABLE 2

|  | Constituent element | Molar proportion F/(X + F) [%] | Diffraction peak angle in first range | Diffraction peak angle in second range | Ion conductivity [mS/cm] |
| --- | --- | --- | --- | --- | --- |
| Example 7 | Li—O—Ta—Cl—F | 1 | 13.84° | 24.90° | 4.2 |
| Example 8 | Li—O—Ta—Cl—F | 2 | 13.83° | 24.89° | 9.1 |
| Example 9 | Li—O—Ta—Cl—F | 3 | 13.88° | 24.93° | 7.8 |
| Example 10 | Li—O—Ta—Cl—F | 4 | 13.84° | 24.89° | 6.5 |
| Example 11 | Li—O—Ta—Nb—Cl—F | 4 | 13.90° | 24.93° | 5.0 |

The solid electrolyte material of Example 7 had diffraction peaks at 13.84° (i.e., in the first range) and 24.90° (i.e., in the second range). Furthermore, the solid electrolyte material also had a diffraction peak resulting from LiCl.

The solid electrolyte material of Example 8 had diffraction peaks at 13.83° (i.e., in the first range) and 24.89° (i.e., in the second range). Furthermore, a diffraction peak resulting from LiCl was also observed.

The solid electrolyte material of Example 9 had diffraction peaks at 13.88° (i.e., in the first range) and 24.93° (i.e., in the second range). Furthermore, a diffraction peak resulting from LiCl was also observed.

The solid electrolyte material of Example 10 had diffraction peaks at 13.84° (i.e., in the first range) and 24.89° (i.e., in the second range). Furthermore, a diffraction peak resulting from LiCl was also observed.

Consideration

As obvious from Table 1, the solid electrolyte materials of Examples 1 to 11 have high ion conductivities of $1 \times 10^{-3}$ mS/cm or more at around room temperature. In addition, as obvious from the reduction starting voltages of the solid electrolyte materials of Examples 1 to 4, a solid electrolyte material including Li, M, O, X, and F has high reduction resistance.

As obvious by comparing Examples 1 to 3 with each other, the reduction starting voltage decreases with an increase in the value of molar proportion F/(X+F). That is, the reduction resistance of a solid electrolyte material is improved with an increase in the value of the molar proportion F/(X+F).

As obvious by comparing Examples 1, 2, and 7 to 10 with Example 3, when the molar proportion F/(X+F) is 1% or more and 10% or less, the ion conductivity of a solid electrolyte material is further increased.

As obvious by comparing Examples 2 and 3 with Example 1, when the molar proportion F/(X+F) is 10% or more and 50% or less, the reduction resistance of a solid electrolyte material is further increased.

Since the solid electrolyte materials of Examples 1 to 11 do not contain sulfur, hydrogen sulfide does not occur.

As described above, the solid electrolyte material of the present disclosure has a high lithium ion conductivity and is therefore suitable for providing a battery having excellent charge and discharge characteristics.

The battery of the present disclosure is used in, for example, an all solid lithium ion secondary battery.

What is claimed is:

1. A solid electrolyte material consisting of:
Li, M, O, X, and F, wherein
M is at least one element selected from the group consisting of Ta and Nb;
X is at least one element selected from the group consisting of Cl, Br, and I; and
the solid electrolyte material includes a first crystal phase having a peak in a first range in which the value of diffraction angle $2\theta$ is 13.7° or more and 14.8° or less in an X-ray diffraction pattern obtained by X-ray diffraction measurement using Cu-K$\alpha$ rays.

2. The solid electrolyte material according to claim 1, wherein X includes Cl.

3. The solid electrolyte material according to claim 2, wherein the X-ray diffraction pattern further includes a peak resulting from the first crystal phase in a second range in which the value of diffraction angle $2\theta$ is 24.0° or more and 25.3° or less.

4. The solid electrolyte material according to claim 1, wherein
a molar proportion of F to the sum of X and F is 1% or more and 50% or less.

5. The solid electrolyte material according to claim 4, wherein
the molar proportion is 1% or more and 10% or less.

6. The solid electrolyte material according to claim 4, wherein
the molar proportion is 10% or more and 50% or less.

7. The solid electrolyte material according to claim 1, further comprising:
a second crystal phase that is different from the first crystal phase.

8. A battery comprising:
a positive electrode;
a negative electrode; and
an electrolyte layer disposed between the positive electrode and the negative electrode, wherein
at least one selected from the group consisting of the positive electrode, the negative electrode, and the electrolyte layer contains the solid electrolyte material according to claim 1.

9. The solid electrolyte material according to claim 1, wherein
the peak in the first range in which the value of diffraction angle $2\theta$ is 13.7° or more and 13.96° or less.

* * * * *